Nov. 5, 1929.   F. ALBACH   1,734,665
GYMNASIUM TRAVELING RINGS
Filed Aug. 10, 1928
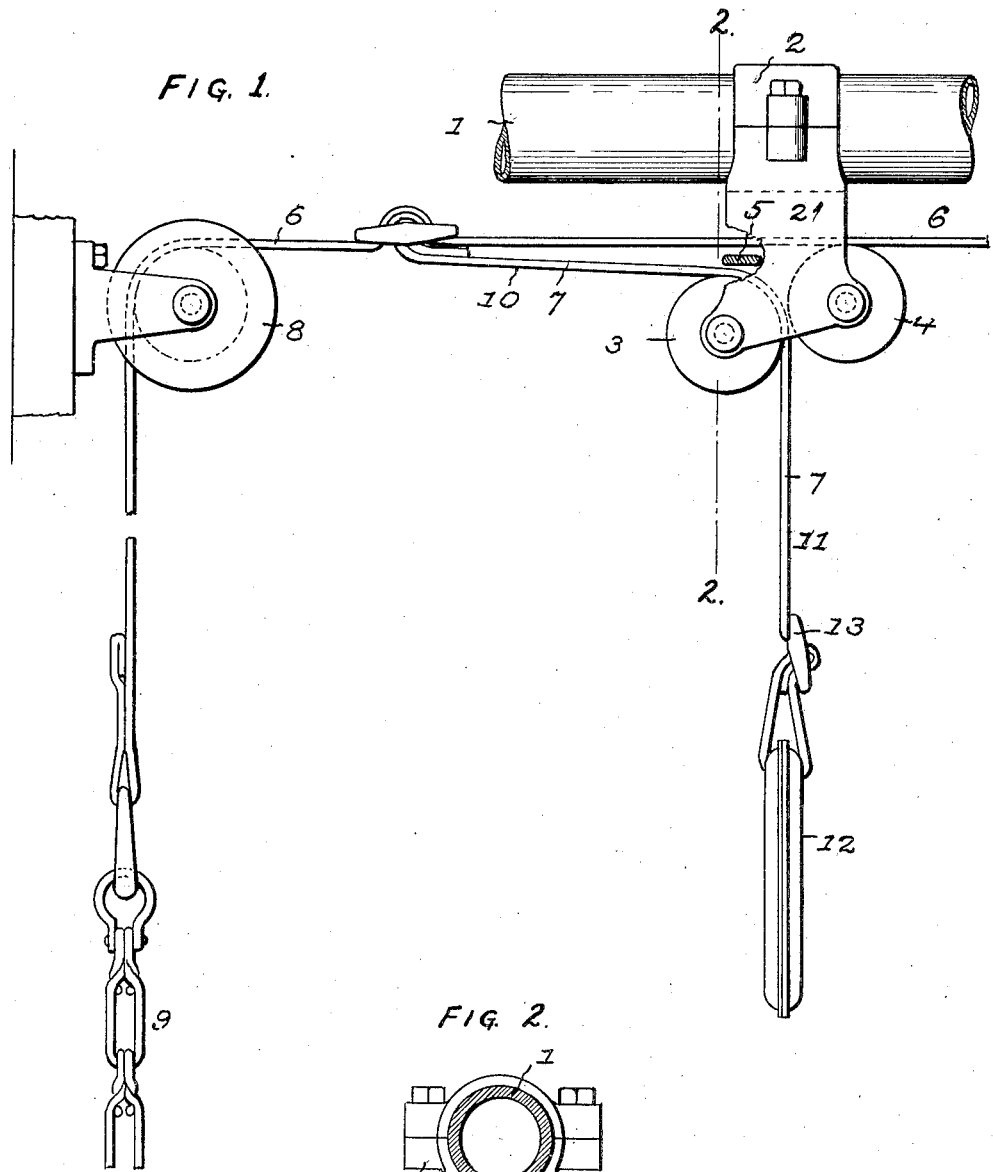
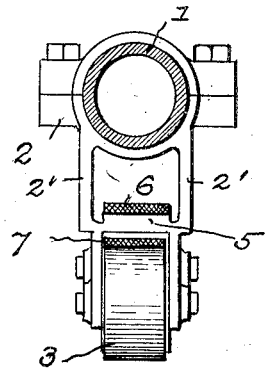
INVENTOR:
FRANK ALBACH,
by Robert Burns,
ATT'Y.

Patented Nov. 5, 1929

1,734,665

UNITED STATES PATENT OFFICE

FRANK ALBACH, OF ST. LOUIS, MISSOURI, ASSIGNOR TO FRED MEDART MANUFACTURING COMPANY, OF ST. LOUIS, MISSOURI, A CORPORATION OF MISSOURI

GYMNASIUM TRAVELING RINGS

Application filed August 10, 1928. Serial No. 298,797.

This invention relates to that type of gymnasium apparatus known as traveling rings, and in which a series of rings are suspended overhead and is spaced in horizontal relation by a series of flexible suspension members, with means provided for effecting simultaneous vertical adjustment to suit the varied requirements of different users. And this improvement has for its object:

To provide a structural formation of the flexible suspension members and associated elements in a traveling ring appliance, whereby a tendency to maintain the series of rings in transverse positions with relation to the longitudinal line in which the series of rings are arranged, and to automatically return said rings to such transverse relation after any displacement therefrom in actual use, all as will hereinafter more fully appear.

In the accompanying drawing:

Fig. 1 is a detail side elevation of an end portion of a traveling ring apparatus, embodying this invention.

Fig. 2 is a detail transverse sectional elevation on line 2—2, Fig. 1.

Like reference numerals indicate like parts in both views.

In this invention an overhead horizontal girder or stringer 1, is fixedly supported at the proper altitude above the floor or ground level, and carries a series of pendant hangers 2, secured thereto at the desired spaced relation one to the other, with each of said hangers formed with side check plates, 2' in spaced relation, and between which a pair of bearing rollers 3 and 4, formed with flat perimeters, are journalled.

In the present construction the roller 3 aforesaid is journalled at a slightly lower altitude than the companion rollers 4, and in connection with such formation and arrangement of the rollers 3, 4, a transverse partition web or rail 5 extends between the aforesaid check plates 2' to aid in keeping the hereinafter described flexible ring suspension members of the apparatus out of intermediate contact one with the other.

The flexible suspension members above referred to comprise a main flexible member 6, and a series of supplementary flexible members 7, of which any required number may be employed, and attached at spaced intervals along the main flexible member 6 in any suitable manner.

The main flexible member 6 aforesaid, extends horizontally the full extent of the apparatus and is supported in parallel to the girder 1 by the series of rollers 4 carried by the brackets 2 of said girder. At one end the main flexible member 6 is deflected by a bearing roller 8 on the wall or adjacent part of the building or other enclosure with such downwardly deflected portion provided with a series of chain links 9 or other like attaching means, whereby the main flexible connection 6 as a whole may be locked at any required adjustment.

The supplementary flexible connections 7 aforesaid, are individual to the series of rollers 3, with each member passing over its roller 3 to be deflected into an upper and approximately horizontal portion 10, the end of which is fixedly attached to the aforesaid main flexible member 6, and into a vertically depending portion 11 at the lower end of which is attached one of the traveling rings 12 of the apparatus.

The series of traveling rings 12 are of the usual circular form and round in cross section, to afford a ready and convenient hold in a hand over hand travel of the user along the apparatus; the connection between a ring 12 and the portion 11 of the flexible connection 7 being preferably of the adjustable buckle 13 type, as shown.

The material part of this invention involves the formation of the main and supplementary flexible members 6 and 7 of a flat band or strap shape in cross section, and from closely woven or like strong and non-extensible material, and in combination with such flat formation of said members 6, 7, a like flat formation of the perimeters of the series of bearing rollers 3 and 4 over which said members pass and are supported. The described formation of the parts is adapted to effectively resist any turning or twisting tendency in the flexible members 6 and 7 and in consequence, the series of traveling rings 12, are maintained at all times in proper transverse relation to the line of travel of the person using the apparatus.

I claim as my invention:

1. A traveling ring exercising apparatus, comprising an overhead support, a bracket attached to said support, a transverse member formed with a rounded flat bearing surface and carried by said bracket, a flexible supporting member of the flat band type passing over such bearing surface to provide a depending portion, a hand ring carried by said depending portion, and means for effecting a lengthwise adjustment of said flexible member.

2. A traveling ring exercising apparatus, comprising an overhead support, a bracket attached to said support, a bearing roller journalled in said bracket and formed with a flat perimeter, a flexible supporting member of the flat band type passing over such roller to provide a depending portion, a hand ring carried by said depending portion, and means for effecting a lengthwise adjustment of said flexible member.

3. A traveling ring exercising apparatus, comprising an overhead support, a bracket attached to said support, a pair of bearing rollers formed with flat perimeters and journalled in said bracket at different altitudes therein, a main flexible supporting member of the flat band type passing horizontally over the uppermost of said rollers, a supplementary flexible member of a flat band type attached to said main member and passing over the other of said rollers and having a depending portion, a hand ring carried by said depending portion of the supplementary member, and means for effecting a lengthwise adjustment of the combined flexible members.

4. A traveling ring exercising apparatus, comprising an overhead support, a bracket attached to said support, a pair of bearing rollers formed with flat perimeters and journalled in said brackets at different altitudes therein, a transverse partition web in said bracket intermediate of the crown of said rollers, a main flexible supporting member of the flat band type passing horizontally over the uppermost of said rollers, and over said transverse web, a supplementary flexible member of a flat band type attached to said main member and passing over the other of said rollers and having a depending portion, a hand ring carried by said depending portion of said member, and means for effecting a lengthwise adjustment of the combined flexible members.

In testimony whereof I hereunto affix my signature.

FRANK ALBACH.